(12) United States Patent
Wu et al.

(10) Patent No.: US 11,217,786 B2
(45) Date of Patent: Jan. 4, 2022

(54) AQUEOUS LITHIUM-ION BATTERY, ELECTRODE USED THEREIN, AND ELECTRODE MANUFACTURING METHOD

(71) Applicant: Industrial Technology Research Institute, Hsinchu (TW)

(72) Inventors: Hung-Chun Wu, Hsinchu County (TW); Nae-Lih Wu, Taipei (TW); Che-Wei Chu, Pingtung County (TW); Yu-Hsiang Lin, New Taipei (TW); Yu-Hsiu Chang, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 97 days.

(21) Appl. No.: 16/255,855

(22) Filed: Jan. 24, 2019

(65) Prior Publication Data
US 2019/0237756 A1 Aug. 1, 2019

Related U.S. Application Data

(60) Provisional application No. 62/622,141, filed on Jan. 26, 2018.

(51) Int. Cl.
*H01M 4/36* (2006.01)
*H01M 4/62* (2006.01)
(Continued)

(52) U.S. Cl.
CPC ......... *H01M 4/366* (2013.01); *H01M 4/0404* (2013.01); *H01M 4/48* (2013.01);
(Continued)

(58) Field of Classification Search
CPC ............. H01M 4/366; H01M 4/0404
See application file for complete search history.

(56) References Cited

U.S. PATENT DOCUMENTS

2011/0177398 A1* 7/2011 Affinito ............... H01M 4/405
429/325
2013/0316234 A1 11/2013 Momose et al.
(Continued)

FOREIGN PATENT DOCUMENTS

| CN | 104205415 | 12/2014 |
| CN | 104362289 | 2/2015 |

(Continued)

OTHER PUBLICATIONS

"Office Action of Taiwan Counterpart Application," dated Sep. 23, 2019, p. 1-p. 3.
(Continued)

*Primary Examiner* — James Lee
(74) *Attorney, Agent, or Firm* — JCIPRNET

(57) ABSTRACT

An aqueous lithium-ion battery and an electrode used therein are provided, wherein the electrode includes a current collector, a coating layer, and a composite layer. The coating layer is disposed on at least one surface of the current collector, and the coating layer contains an active material. The composite layer is disposed on a surface of the coating layer. The composite layer includes a first film and a second film, wherein the first film is between the second film and the surface of the coating layer, and the water contact angle of the first film is greater than the water contact angle of the second film.

17 Claims, 20 Drawing Sheets

(51) Int. Cl.
  *H01M 10/36* (2010.01)
  *H01M 4/04* (2006.01)
  *H01M 4/587* (2010.01)
  *H01M 4/485* (2010.01)
  *H01M 4/58* (2010.01)
  *H01M 4/48* (2010.01)
  *H01M 4/02* (2006.01)

(52) U.S. Cl.
  CPC ............ *H01M 4/485* (2013.01); *H01M 4/58* (2013.01); *H01M 4/587* (2013.01); *H01M 4/5815* (2013.01); *H01M 4/621* (2013.01); *H01M 4/624* (2013.01); *H01M 4/628* (2013.01); *H01M 10/36* (2013.01); *H01M 4/622* (2013.01); *H01M 4/623* (2013.01); *H01M 4/625* (2013.01); *H01M 4/626* (2013.01); *H01M 2004/027* (2013.01); *H01M 2300/0002* (2013.01)

(56) References Cited

U.S. PATENT DOCUMENTS

| | | |
|---|---|---|
| 2014/0178747 A1 | 6/2014 | Tsai et al. |
| 2014/0342192 A1 | 11/2014 | Wang et al. |
| 2015/0017540 A1* | 1/2015 | Wata .............. H01M 4/13 429/231.5 |
| 2016/0218341 A1 | 7/2016 | Kumar et al. |
| 2017/0301910 A1 | 10/2017 | Wang et al. |

FOREIGN PATENT DOCUMENTS

| | | |
|---|---|---|
| CN | 104558649 | 4/2015 |
| CN | 104937746 | 9/2015 |
| CN | 105531856 | 4/2016 |
| CN | 103904291 | 12/2016 |
| CN | 106660798 | 5/2017 |
| CN | 107123788 | 9/2017 |
| CN | 110085802 | 8/2019 |
| CN | 110085865 | 8/2019 |
| GN | 102017247 | 4/2011 |
| GN | 102544455 | 7/2012 |
| GN | 103794800 | 5/2014 |
| GN | 104425825 | 3/2015 |
| JP | 2011198510 | 10/2011 |
| JP | 2013030408 | 2/2013 |
| JP | 2016058211 | 4/2016 |
| JP | 2017124951 | 7/2017 |
| TW | I423502 | 1/2014 |

OTHER PUBLICATIONS

"Office Action of Taiwan Counterpart Application", dated Nov. 12, 2018, p. 1-p. 3.

Suo, L. et al., "Water-in-salt" electrolyte enables high-voltage aqueous lithium-ion chemistries, Science, vol. 350, No. 6263, Nov. 20, 2015, pp. 938-943.

Suo, L. et al., "Advanced High-Voltage Aqueous Lithium-Ion Battery Enabled by "Water-in-Bisalt" Electrolyte," Angew Chem Int Ed Engl., vol. 55, No. 25, Jun. 2016, pp. 7136-7142.

Jing Luo et al., "High Polarity Poly(vinylidene difluoride) Thin Coating for Dendrite-Free and High-Performance Lithium Metal Anodes," Adv. Energy Mater., vol. 7, Sep. 2017, pp. 1-7.

Chongyin Yang et al., "4.0 V Aqueous Li-Ion Batteries," Joule, vol. 1, No. 1, Sep. 6, 2017, pp. 122-132.

Xujiong Wang et al., "An Aqueous Rechargeable Lithium Battery Using Coated Li Metal as Anode," Scientific Reports, vol. 3, No. 1401, Mar. 7, 2013, pp. 1-5.

Kim, H, et al., "Aqueous rechargeable Li and Na ion batteries," Chemical reviews, vol. 114, Sep. 2014, pp. 11788-11827.

W. Sun et al., "Water-in-Salt" electrolyte enabled LiMn2O4/TiS2 Lithium-ion batteries, Electrochemistry Communications, vol. 82, Sep. 2017, pp. 71-74.

"Office Action of China Counterpart Application", dated Feb. 2, 2021, p. 1-p. 8.

"Office Action of China Counterpart Application", dated Nov. 30, 2020, pp. 1-7.

"Notice of Allowance of China Counterpart Application," dated Jun. 30, 2021, p. 1-p. 4, in which the listed references were cited.

* cited by examiner

AQUEOUS LITHIUM-ION BATTERY, ELECTRODE USED THEREIN, AND ELECTRODE MANUFACTURING METHOD

CROSS-REFERENCE TO RELATED APPLICATION

This application claims the priority benefit of U.S. provisional application Ser. No. 62/622,141, filed on Jan. 26, 2018. The entirety of the above-mentioned patent application is hereby incorporated by reference herein and made a part of this specification.

TECHNICAL FIELD

The disclosure relates to an aqueous lithium-ion battery, an electrode used therein, and an electrode manufacturing method.

BACKGROUND

Currently, commercial lithium-ion batteries mostly adopt organic electrolyte. However, batteries adopting such organic electrolyte have safety concerns. Since the demand for energy density and power density of storage devices is continuously rising, the organic electrolyte needs to withstand greater levels of operating voltage and operating current. However, in the case of the common ester electrolyte solvent, it has the chemical properties of flammability and high reactivity, and therefore when a lithium-ion battery is used in a large-current and high-temperature environment for a long time, the electrolyte may be vaporized or oxidized, and may even combust; at the same time, the most-commonly used solute salt of the lithium-ion battery: lithium hexafluorophosphate ($LiPF_6$), still has drawbacks such as poor thermal stability, high decomposition rate when in contact with water, and high toxicity.

Therefore, currently, many studies have begun to research the possibility of using aqueous electrolyte for lithium-ion batteries. The aqueous electrolyte has effects such as high safety, environmental friendliness, low cost, and high ion conductivity. However, the most serious issue facing the aqueous electrolyte is the extremely small operating voltage window (1.23 V) of water molecules, and once the range is exceeded, water decomposition reaction occurs, and such a small operating voltage range does not allow the aqueous lithium-ion battery to meet the expectation of the high efficacy of electrical energy storage.

In recent years, an aqueous solution in which lithium bis(trifluoromethanesulfonyl)imide (LiTFSI) is used as the solute has been applied as an electrolyte in lithium-ion batteries. Such an electrolyte has the property of high solubility, and when the concentration reaches 21 m (weight molar concentration: mole/kg), the operating voltage range of the aqueous electrolyte solution may be expanded from 1.23 V to 3 V. However, when the operating voltage is expanded by using a high-concentrated LiTFSI electrolyte, the issue of high cost also occurs.

SUMMARY

The electrode of an aqueous lithium-ion battery of the disclosure includes a current collector, a coating layer, and a composite layer. The coating layer is disposed on at least one surface of the current collector, and the coating layer includes an active material. The composite layer is disposed on a surface of the coating layer, and the composite layer includes a first film and a second film, wherein the first film is between the second film and the surface of the coating layer, and the water contact angle of the first film is greater than the water contact angle of the second film.

The aqueous lithium-ion battery of the disclosure includes a cathode, an anode, an aqueous electrolyte, and a separator disposed between the cathode and the anode, wherein the anode is the aforementioned electrode of the aqueous lithium-ion battery.

The method of manufacturing an electrode of an aqueous lithium-ion battery of the disclosure includes composite providing a current collector; forming a coating layer on at least one surface of the current collector, and the coating layer contains an active material; and forming a composite layer on a surface of the coating layer, and the composite layer comprises a first film and a second film, wherein at least one of the first film and the second film is formed by impregnation, and the water contact angle of the first film is greater than the water contact angle of the second film.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF THE EMBODIMENTS

Embodiments and accompanying figures are provided below to more sufficiently explain the disclosure, but the disclosure may still be implemented in a plurality of different forms and should not be construed as limited to the embodiments of the present specification. In the figures, for clarity, each component and the relative size thereof may not be shown according to actual size.

Figure 1A:
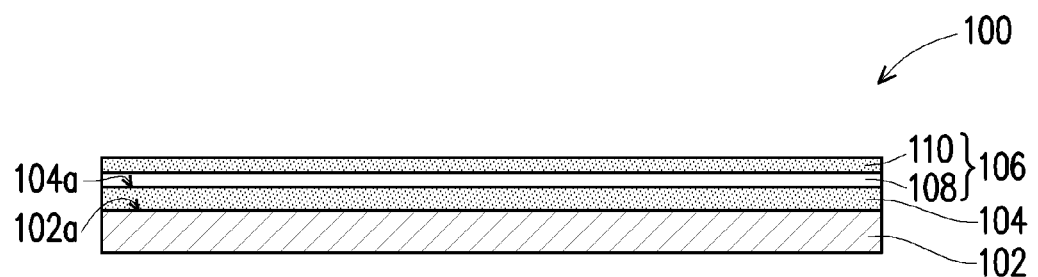
FIG. 1A is a schematic cross-sectional view of an electrode of an aqueous lithium-ion battery according to the first embodiment of the disclosure.

FIG. 1A is a schematic cross-sectional view of an electrode of an aqueous lithium-ion battery according to the first embodiment of the disclosure.

Referring to FIG. 1A, an electrode 100 of the first embodiment includes a current collector 102, a coating layer 104, and a composite layer 106. The current collector 102 may be a solid substance having a conductivity between 1 S/m and $1 \times 10^8$ S/m in normal conditions (20° C. and 1 atm, normal temperature and pressure (NTP), National Institute of Standards and Technology (NIST)), such as a titanium foil, aluminum foil, copper foil, etc. The coating layer 104 is disposed on at least one surface 102a of the current collector 102, the coating layer 104 mainly includes an active material, and conductive particles and a binder may be added.

Moreover, the coating layer 104 may also be disposed on two surfaces of the current collector 102. In an embodiment, the active material includes lithium element, a transition metal element, a Group XIII to Group XV element (IUPAC) or an oxide, sulfide, nitride, phosphide, or carbide thereof, or a combination of the above. In another embodiment, the active material includes metastable phase spherical carbon (MCMB), vapor-grown carbon fiber (VGCF), carbon nanotube (CNT), coke, carbon black, natural graphite, artificial graphite, acetylene black, carbon fiber, glassy carbon, $Li_2O$, $Li_3FeN_2$, $Li_{2.6}Co_{0.4}N$, $Li_{2.6}Cu_{0.4}N$, SnO, $SnO_2$, GeO, $GeO_2$, $In_2O$, $In_2O_3$, PbO, $PbO_2$, $Pb_2O_3$, $Pb_3O_4$, $Ag_2O$, AgO, $Ag_2O_3$, $Sb_2O_3$, $Sb_2O_4$, $Sb_2O_5$, SiO, SiC, ZnO, CoO, NiO, FeO, $TiO_2$, $Li_3Ti_5O_{12}$, $Li_4Ti_5O_{12}$, $Mo_6S_8$, or a combination of the above. The conductive particles in the coating layer 104 are, for instance, grain graphite, VGCF, carbon black, acetylene black, nickel powder, aluminum powder, titanium powder, stainless steel powder, or a combination of the above. The binder in the coating layer 104 may be sodium alginate, polyvinylidene fluoride (PVDF), styrene-butadiene rubber (SBR), polyamide, melamine resin, or a combination of the above, and a suitable solvent for the binder is, for instance, a single solvent or a cosolvent system selected from water, γ-butyrolactone, propylene carbonate, N-methylpyrrolidone, and dimethylacetamide. However, the disclosure is not limited thereto, and a known binder and other suitable solvents may also be used.

Referring further to FIG. 1A, the composite layer 106 in the present embodiment is disposed on a surface 104a of the coating layer 104, and the composite layer 106 includes a first film 108 and a second film 110, wherein the first film 108 is between the second film 110 and the surface 104a of the coating layer 104, and the first film 108 and the second film 110 have different polarities. In another embodiment, the composite layer 106 consists of the first film 108 and the second film 110. Since the polarities of the first film 108 and the second film 110 are different, physical properties such as surface energy, surface tension, hydrophobicity, or wetting are also different. The physical properties above may be measured differences in defining polarities via contact angle. For instance, the water contact angle of the first film 108 is greater than the water contact angle of the second film 110. In the disclosure, unless otherwise stated, "water contact angle" represents a water contact angle $\theta_c$ captured by a fast camera at 50 minutes after water contacts the surface of the layer. In one embodiment, the water contact angle of the first film 108 is, for instance, between 50° and 110°; and the water contact angle of the second film 110 is, for instance, between 10° and 30° or between 10° and 20°.

In one embodiment, the material of the first film 108 is, for instance, selected from a polymer polymerized from a monomer of fluorocarbons or chlorocarbons or a copolymer formed by a combination of aforementioned monomers or functionalized monomers thereof, and each monomer above includes, for instance, hexafluoropropene, polytetrafluoroethylene, vinyl fluoride, vinylidene difluoride, trifluorochloroethylene, vinyl chloride, or vinylidene chlorides. In an embodiment, the material of the first film 108 may be polyvinylidene fluoride (PVDF), polytetrafluoroethylene (PTFE), or a combination of the above.

In one embodiment, the material of the second film 110 is, for instance, a mixture of a first substance and a second substance. Moreover, in terms of regulating the water contact angle of the second film 110, the weight ratio of the first substance to the second substance is between 3:2 and 2:3. The first film may be selected from a polymer polymerized from a monomer of fluorocarbons or chlorocarbons or a copolymer formed by a combination of aforementioned monomers or functionalized monomers thereof, and the monomers above include, for instance, hexafluoropropylene, tetrafluoroethylene, vinyl fluoride, vinylidene fluoride, chlorotrifluoroethylene, vinyl chloride, or vinylidene chloride; the second substance may be selected from a polymer formed by a monomer of fluorocarbon, chlorocarbon, aromatic hydrocarbon, heterocyclic compound, alcohol, ether, carboxylic acid, ester, or amide, or a copolymer formed by a combination of aforementioned monomers or functionalized monomers thereof, and the monomers include, for instance, hexafluoropropylene, tetrafluoroethylene, vinyl fluoride, vinylidene fluoride, chlorotrifluoroethylene, vinyl chloride, vinylidene chloride, styrene, 2-oxazoline, ethylene glycol, vinyl ether, acrylic acid, vinyl acetate, N-isopropylacrylamide, or acrylamide. In an embodiment, the material of the second film 110 may be a perfluorosulfonic acid-polytetrafluoroethylene copolymer (Nafion), PVDF, PTFE, PVA, or a combination of the above.

Since the electrode 100 of the present embodiment has the first film 108 and the second film 110 having different polarities, the first film 108 having a greater water contact angle and in contact with the coating layer 104 may be used with the outer-layer second film 110 having a smaller water contact angle to inhibit hydrogen evolution reaction and enhance the operating voltage window of the aqueous lithium-ion battery.

Figure 1B:
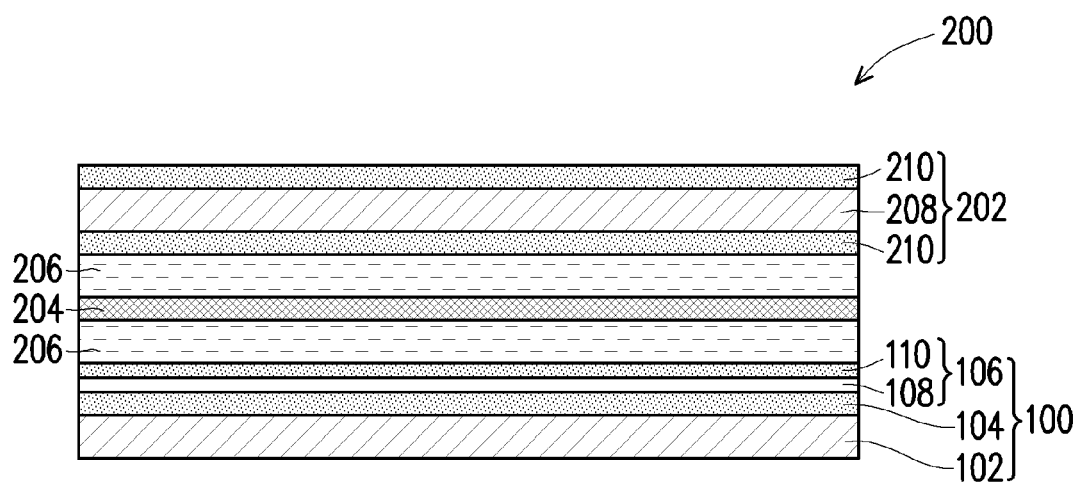
FIG. 1B is a schematic cross-sectional view of an aqueous lithium-ion battery according to the second embodiment of the disclosure.

FIG. 1B is a schematic cross-sectional view of an aqueous lithium-ion battery according to the second embodiment of the disclosure, wherein the same reference numerals as the first embodiment are used to represent the same or similar devices, and descriptions of the same technical content are omitted. The omitted portions are as described in the above embodiments and are not repeated in the present embodiment.

In FIG. 1B, an aqueous lithium-ion battery 200 includes a cathode 202, an anode 100, a separator 204 disposed between the cathode 202 and the anode 100, and an aqueous electrolyte 206, wherein the anode 100 is the electrode of the first embodiment, and the composite layer 106 of the anode 100 is located on the surface of the coating layer 104 toward the separator 204. In another embodiment, the coating layer 104 of the anode 100 may be located on two surfaces of the current collector 102, and the composite layer 106 may be located on the surface of the coating layer 104. In the present embodiment, the aqueous electrolyte 206 includes lithium salt and water. The lithium salt is, for instance, lithium bis(trifluoromethylsulfonyl)imide (LiTFSI), $LiNO_3$, or lithium trifluoromethanesulfonate (LiOTf). The cathode 202 includes a current collector 208 and a coating layer 210 coated on the current collector 208, and the coating layer 210 of the cathode 202 is located on two surfaces of the current collector 208. In another embodiment, the coating layer 210 of the cathode 202 may be located on at least one surface of the current collector 208. The current collector 208 may be a solid substance having a conductivity between 1 S/m and $1 \times 10^8$ S/m in normal conditions (20° C. and 1 atm), such as a titanium foil, aluminum foil, or copper foil. The coating layer 210 may include an active material, conductive particle, and binder. The active material in the coating layer 210 may be one selected from the group consisting of the elements of titanium, vanadium, manganese, iron, cobalt, nickel, molybdenum, lithium, oxygen, sulfur, and phosphorus or a composition formed by a combination of the above, such as (but not limited to) lithium nickel cobalt aluminum oxide (NCA), lithium nickel cobalt manganese oxide (LNCM), lithium cobalt oxide ($LiCoO_2$), lithium manganese oxide ($LiMnO_2$), lithium nickel oxide ($LiNiO_2$), lithium iron phosphate oxide ($LiFePO_4$), or lithium nickel cobalt manganese oxide ($LiNi_{0.5}Co_{0.2}Mn_{0.3}O_2$). The conductive particle in the coating layer 210 may be, for instance, a carbon material, nickel powder, aluminum powder, titanium powder, stainless steel powder, or a combination of the above, and the carbon material may be (but not limited to), grain graphite (such as KS4 (4 μm) or KS6 (6 μm)), vapor-grown carbon fiber (VGCF), carbon black, or acetylene black. The binder in the coating layer 210 may, for instance, improve the mechanical properties of the electrode, and a suitable binder may be sodium alginate, polyvinylidene fluoride, styrene-butadiene rubber (SBR), polyamide, melamine resin, or a combination of the above, and a suitable solvent for the binder includes (but is not limited to): a single solvent or a cosolvent system selected from water, γ-butyrolactone, ethylene carbonate, propylene carbonate, diethyl carbonate, propyl acetate, dimethyl carbonate, ethylmethyl carbonate, N-methylpyrrolidone, and dimethylacetamide.

Since the anode 100 of the aqueous lithium-ion battery 200 of the present embodiment has the first film 108 and the second film 110 having different water contact angles, when the first film 108 having a greater water contact angle and in contact with the coating layer 104 is used with the outer-layer second film 110 having a smaller water contact angle, the effects of stabilizing the charge and discharge reaction and inhibiting the irreversible reaction of the aqueous lithium-ion battery 200 may be achieved, and the effect of extending cycle life is further achieved.

Figure 1C:
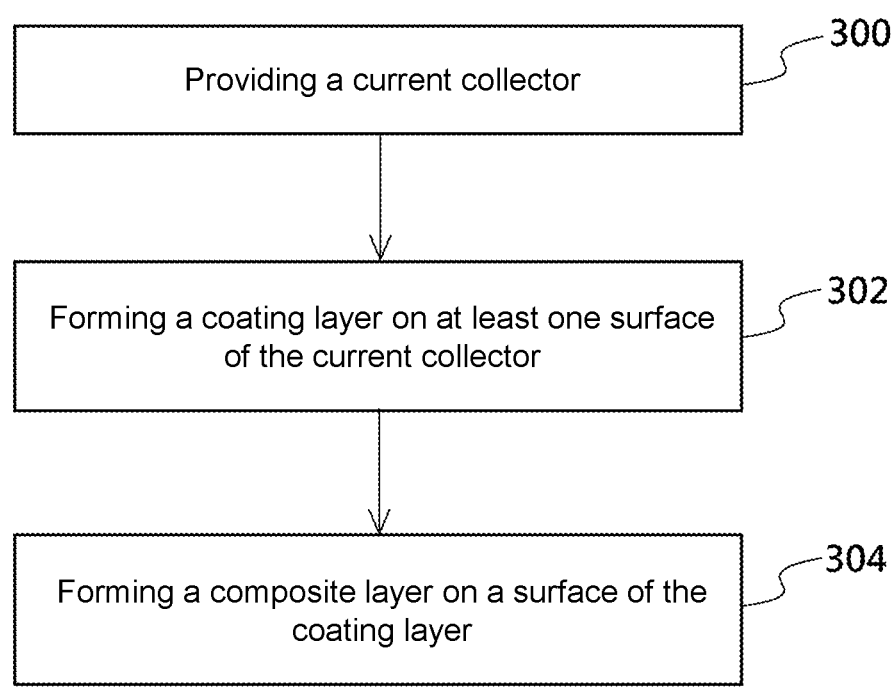
FIG. 1C is a process flow of manufacturing an electrode of an aqueous lithium-ion battery according to the third embodiment of the disclosure.

FIG. 1C is a process flow of manufacturing an electrode of an aqueous lithium-ion battery according to the third embodiment of the disclosure.

Referring to FIG. 1C, step 300 is performed to provide a current collector. Then, step 302 is performed to form a coating layer on at least one surface of the current collector, and the coating layer contains an active material. The procedures of forming a coating layer are as described in the above embodiments and are not repeated in the present embodiment. In particular, the step 302 can include mixing the active material, the conductive particles, the binder, and the solvent to form a mixture; next, coating the mixture on at least one surface of a prepared current collector; and then removing the solvent by drying to form the coating layer. The method of coating the mixture on at least one surface of a prepared current collector can be doctor blade coating, comma blade coating, T-die coating, gravure coating, etc. In one embodiment, the step 302 can further include rolling pressing and baking after removing the solvent by drying at 65° C. to 150° C.

Then, step 304 is performed to form a composite layer on a surface of the coating layer. The composite layer includes a first film and a second film, and the water contact angle of the first film is greater than the water contact angle of the second film. The first film and the second film are as described in the above embodiments and are not repeated in the present embodiment. In one embodiment, the step of forming the composite layer includes forming the first film on the surface of the coating layer and then forming the second film on the first film.

In one embodiment, the step of forming the first film on the coating layer can include mixing the material of the first film and a solvent to form a mixture; next, coating the mixture on the coating layer, and then removing the solvent by drying at 65° C. to 100° C. to form the first film. The solvent can be a single solvent or a cosolvent system selected from water, γ-butyrolactone, propylene carbonate, N-methylpyrrolidone, and dimethylacetamide. The method of coating the mixture on the coating layer can be doctor blade coating, comma blade coating, T-die coating, gravure coating, etc. Alternatively, the step of coating the mixture on the coating layer may be replaced by performing impregnation of the current collector having the coating layer in the mixture for a period of time (for example, 20 mins to 60 mins). In one embodiment, the step of performing impregnation of the current collector having the coating layer in the mixture can be performed under negative pressure environment, in the purpose to make the mixture impregnate completely into the crack of coating layer and avoid the direct contact between coating layer and electrolyte. The "negative pressure environment" means that the internal air of the manufacturing container or chamber is forced out unnaturally, then the outer container static pressure is relatively higher than the inner container static pressure. The negative pressure can be less than 100 mmHg.

In particular, the step of forming the second film on the first film can include mixing the material of the second film and a solvent to form a mixture; next, coating the mixture on the first film, and then removing the solvent by drying at 65° C. to 100° C. to form the second film. The solvent can be a single solvent or a cosolvent system selected from water, γ-butyrolactone, propylene carbonate, N-methylpyrrolidone, and dimethylacetamide. The method of coating the mixture on the first film can be doctor blade coating, comma blade coating, T-die brush coating, gravure coating, etc. Alternatively, the step of coating the mixture on the first film may be replaced by performing impregnation of the current collector having the coating layer and the first film in the mixture for a period of time (for example, 20 mins to 60 mins). In one embodiment, the step of performing impregnation of the current collector having the coating layer and the first film in the mixture can carry out under negative pressure. The negative pressure can be less than 100 mmHg.

A number of experimental examples are described as below to verify the efficacy of the disclosure. However, the disclosure is not limited to the following content.

Preparation Example 1

Figure 2:
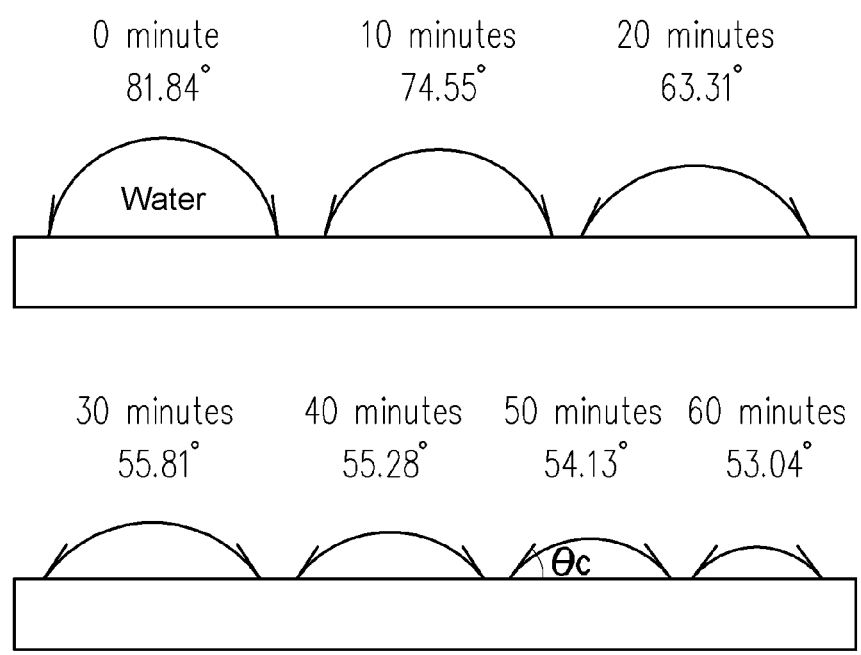
FIG. 2 is a schematic of a water contact angle of a polyvinylidene fluoride (PVDF) layer of preparation example 1 changing with time.

First, PVDF powders were added in a dimethylacetamide (DMAC) solvent to prepare a PVDF homogeneous solution. The solvent may be selected according to different materials to dissolve the material to form a homogeneous solution or a uniform suspension, such as PVDF in DMAC solvent, PVDF in N-methylpyrrolidone (NMP) solvent, or PTFE in ethanol solvent. Next, the homogeneous solution was uniformly coated on a titanium foil used as a current collector via a doctor blade coating method, and the titanium foil was placed in an oven for drying to completely volatilize the solvent to form a PVDF layer used as a first film on the current collector. The schematic of FIG. 2 shows the water contact angle of the PVDF layer captured by a fast camera changing with time. In FIG. 2, the water contact angle of the PVDF layer is 81.84° at 0 minute and 54.13° at 50 minutes. In other words, the water contact angle of the first film changed with time, and the water contact angle $\theta_c$ obtained at 50 minutes is 54.13°, and therefore in the disclosure, the water contact angle captured at 50 minutes after water contacts the layer surface serves as the standard.

Next, a prepared PVDF homogeneous solution and a commercial Nafion solution were mixed to prepare a colloidal solution having a weight ratio of PVDF:Nafion=1:1, and then the PVDF/Nafion colloidal solution was uniformly coated on the PVDF layer of the first film via a doctor blade coating method, and lastly the result was placed in an oven for drying to completely volatilize the solvent to obtain PVDF/Nafion as a second film. The electrode was obtained. The water contact angle of the PVDF/Nafion layer was 92.40° at 0 minutes and 26.31° at 50 minutes as captured by a fast camera.

Comparative Preparation Example 1

A titanium foil was used as the electrode.

Experimental Example 1

Figure 3A:
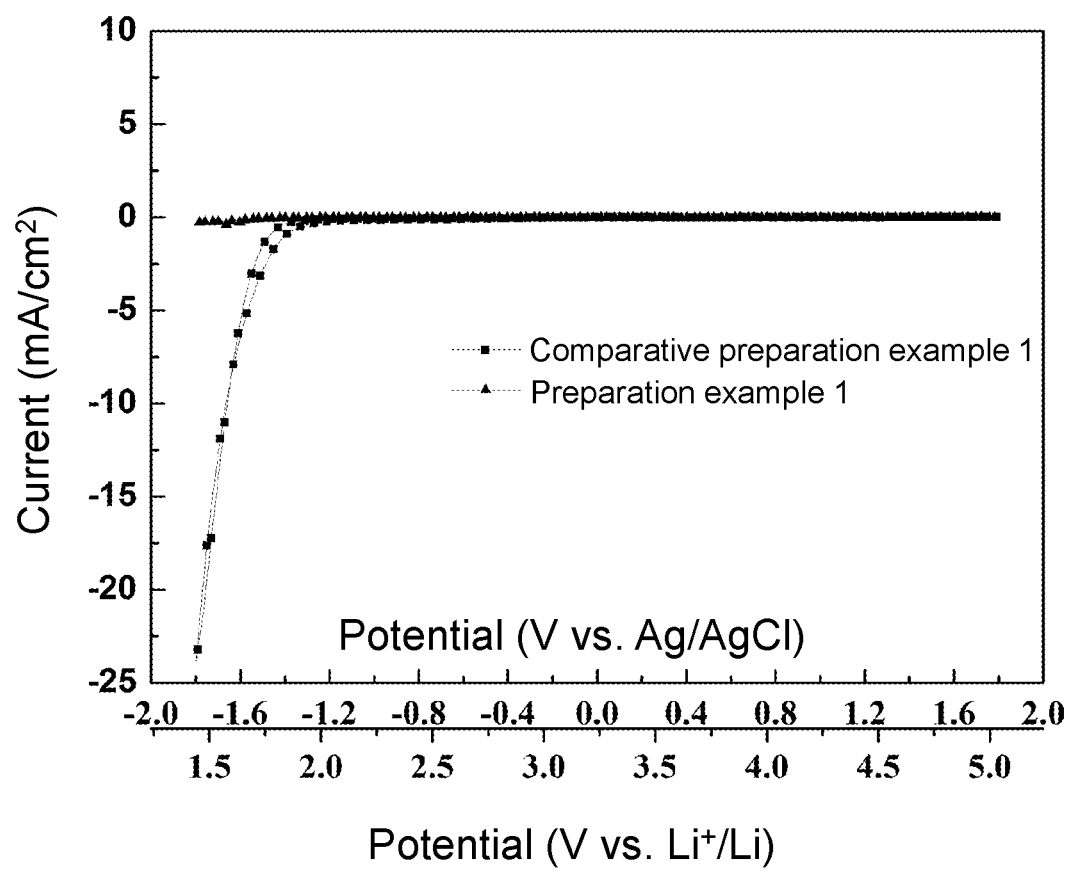
FIG. 3A is a cyclic voltammogram of the 1st cycle of comparative preparation example 1 and preparation example 1.
Figure 3B:
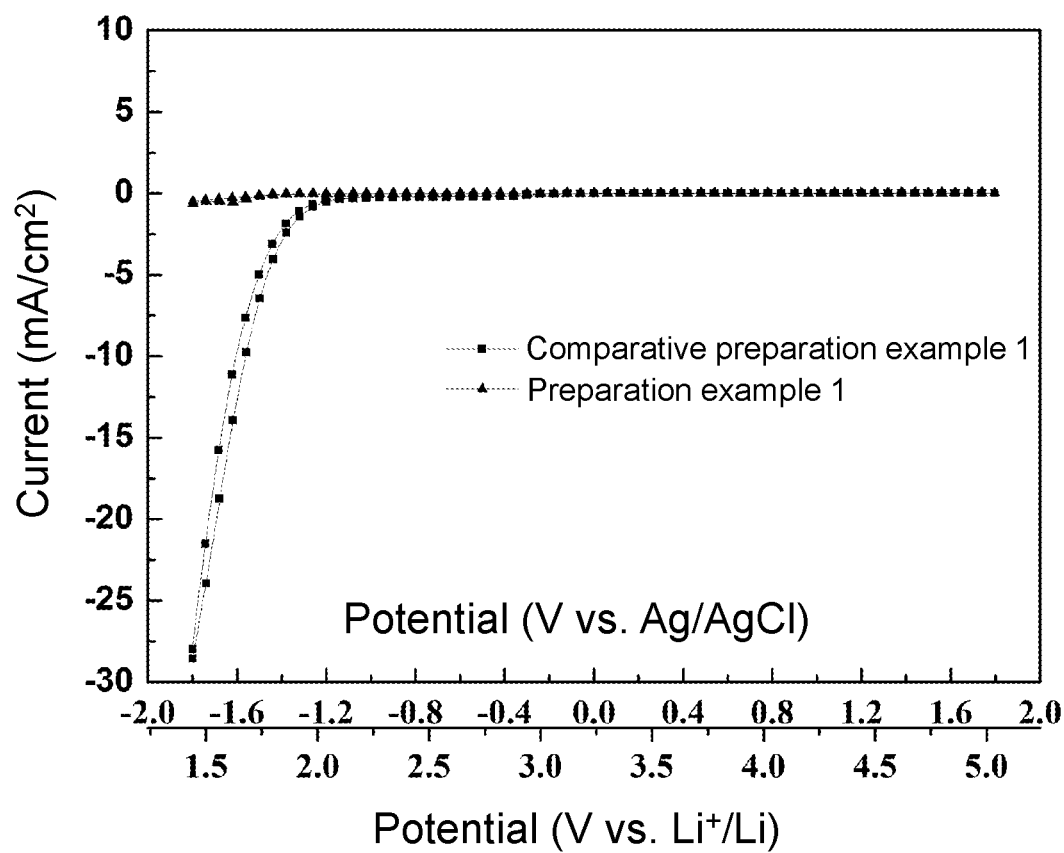
FIG. 3B is a cyclic voltammogram of the 5th cycle of comparative preparation example 1 and preparation example 1.

The electrodes of comparative preparation example 1 and preparation example 1 were placed in a 10 m LiTFSI aqueous electrolyte, and cyclic voltammetry scanning was performed at a scan rate of 1 mV/s to obtain FIG. 3A and FIG. 3B. FIG. 3A shows a cyclic voltammogram of the 1st cycle of comparative preparation example 1 and preparation example 1; and FIG. 3B shows a cyclic voltammogram of the 5th cycle of comparative preparation example 1 and preparation example 1.

It may be obtained from FIG. 3A that, in comparative preparation example 1, the hydrogen evolution current of the 1st cycle at −1.8 V (vs. Ag/AgCl) was about 25 mA/cm², and in preparation example 1, the hydrogen evolution current of the 1st cycle at the voltage of −1.8 V (vs. Ag/AgCl) was about 0.25 mA/cm². Therefore, at the same hydrogen evolution potential (−1.8 V vs. Ag/AgCl), the hydrogen evolution current of the electrode of preparation example 1 was significantly less than that of the blank titanium foil electrode of comparative preparation example 1.

Moreover, it may be obtained from FIG. 3B that, at the same hydrogen evolution potential (−1.8 V vs. Ag/AgCl), the hydrogen evolution current of the 5th cycle of preparation example 1 was 0.7 mA/cm², but the hydrogen evolution current of the 5th cycle of comparative preparation example 1 was 27 mA/cm². The results show that as the number of cycles is increased, the hydrogen evolution current is also increased, but the electrode having a composite layer (first film: PVDF layer; second film: PVDF/Nafion layer) via coating has excellent inhibition of hydrogen evolution effect.

Preparation Example 2

An electrode was made using the same method as preparation example 1, but the titanium foil was changed to aluminum foil.

Comparative Preparation Example 2

An aluminum foil was used as the electrode.

Experimental Example 2

Figure 4:
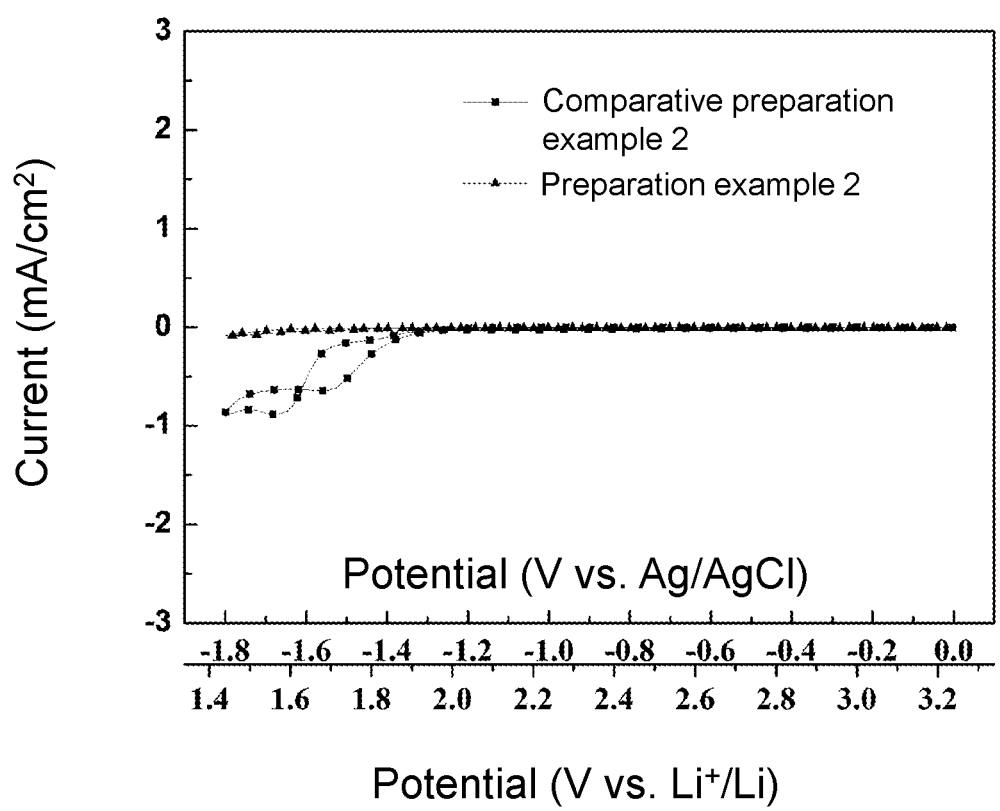
FIG. 4 shows a cyclic voltammogram of the 1st cycle of comparative preparation example 2 and preparation example 2.

The electrodes of comparative preparation example 2 and preparation example 2 were placed in a 10 m LiTFSI aqueous electrolyte, and cyclic voltammetry scanning was performed at a scan rate of 1 mV/s to obtain FIG. 4. FIG. 4 shows a cyclic voltammogram of the 1st cycle of comparative preparation example 2 and preparation example 2.

It may be obtained from FIG. 4 that, in comparative preparation example 2, the hydrogen evolution current of the 1st cycle at −1.8 V (vs. Ag/AgCl) was about 1 mA/cm², and in preparation example 2, the hydrogen evolution current of the 1st cycle at the voltage of −1.8 V (vs. Ag/AgCl) was about 0.1 mA/cm². Therefore, at the same hydrogen evolution potential (−1.8 V vs. Ag/AgCl), the hydrogen evolution current of the electrode of preparation example 2 is significantly less than that of the blank aluminum foil electrode of comparative preparation example 2.

Experimental Example 3

Cyclic voltammetry scanning was performed on the electrode of comparative preparation example 1 in a 21 m LiTFSI aqueous electrolyte at a scan rate of 1 mV/s. Moreover, cyclic voltammetry scanning was performed on the electrode of preparation example 1 placed in a 10 m LiTFSI aqueous electrolyte at a scan rate of 1 mV/s. The two experimental results are shown in the same curve diagram to obtain FIG. 5A and FIG. 5B.

Figure 5A:
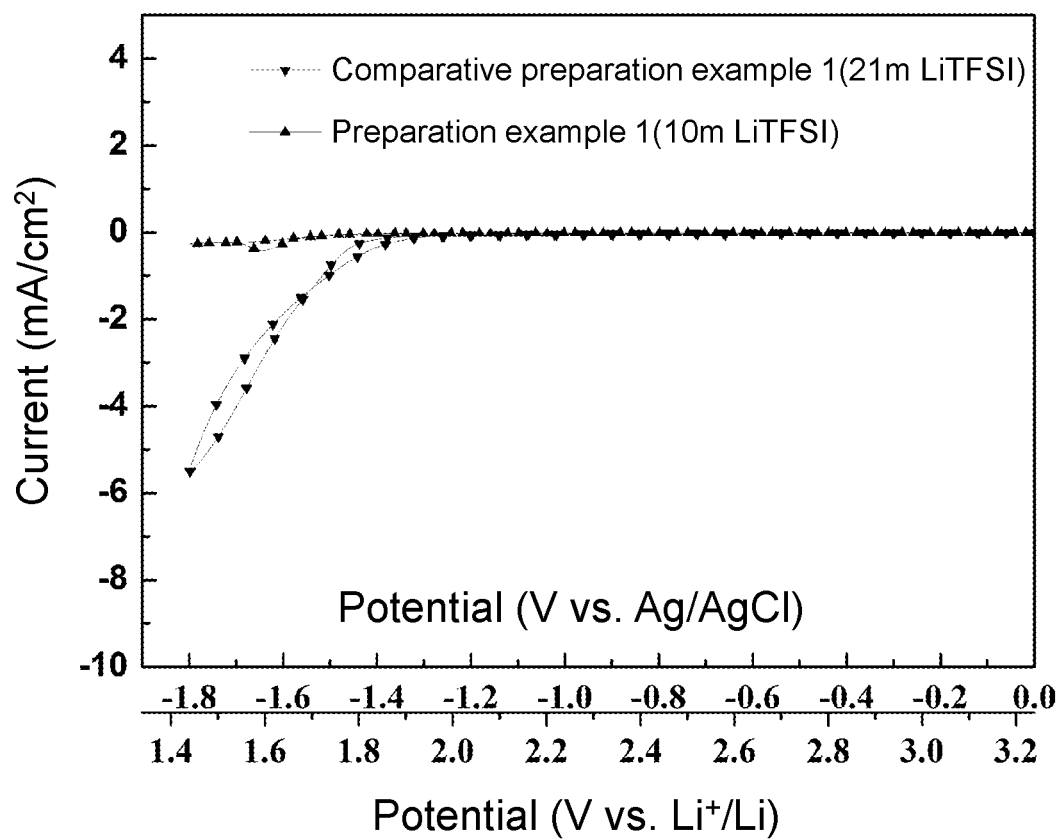
FIG. 5A is a cyclic voltammogram of the 1st cycle of comparative preparation example 1 in a high-concentrated electrolyte and preparation example 1 in a low-concentrated electrolyte.

It may be obtained from FIG. 5A that, in comparative preparation example 1 in which a high-concentrated aqueous electrolyte was used, the hydrogen evolution current of the 1st cycle at −1.8 V (vs. Ag/AgCl) is about 5.5 mA/cm$^2$, and in preparation example 1 in which a low-concentrated aqueous electrolyte was used, the hydrogen evolution current of the 1st cycle at the voltage of −1.8 V (vs. Ag/AgCl) is about 0.1 mA/cm$^2$. Therefore, the electrode of preparation example 1 may achieve better inhibition of hydrogen evolution effect in a low-concentrated (10 m) electrolyte than in a high-concentrated (21 m) electrolyte.

Figure 5B:
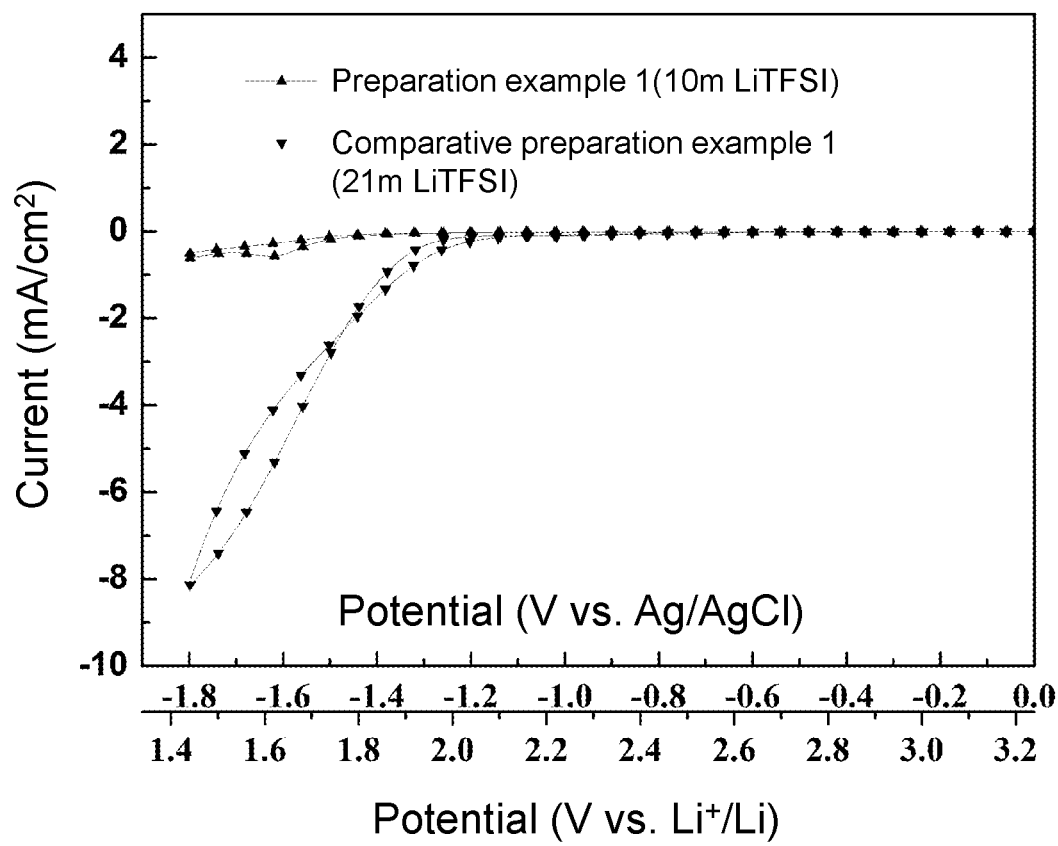
FIG. 5B is a cyclic voltammogram of the 5th cycle of comparative preparation example 1 in a high-concentrated electrolyte and preparation example 1 in a low-concentrated electrolyte.

It may be obtained from FIG. 5B that, in comparative preparation example 1 in which a high-concentrated aqueous electrolyte was used, the hydrogen evolution current of the 5th cycle at −1.8 V (vs. Ag/AgCl) is about 8 mA/cm$^2$, and in preparation example 1 in which a low-concentrated aqueous electrolyte was used, the hydrogen evolution current of the 5th cycle at the voltage of −1.8 V (vs. Ag/AgCl) is about 0.1 mA/cm$^2$. Therefore, after many cycles of scanning in a low-concentrated (10 m) electrolyte, the electrode of preparation example 1 still has better inhibition of hydrogen evolution effect than in a high-concentrated (21 m) electrolyte.

Experimental Example 4

Figure 6:
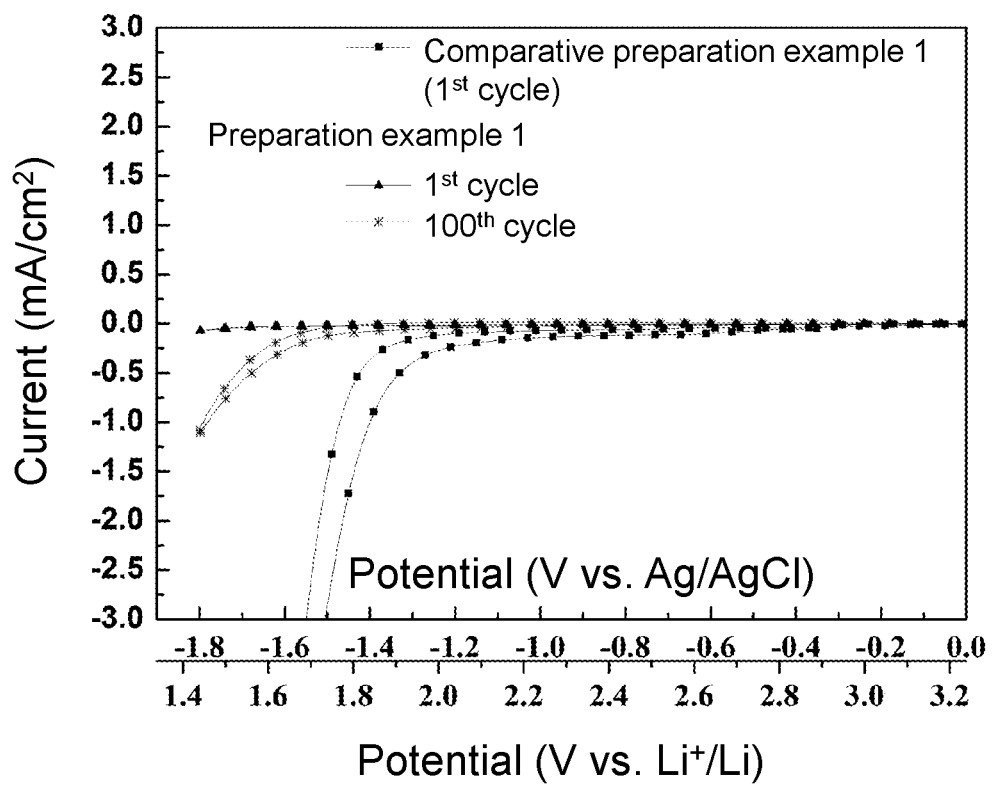
FIG. 6 is a cyclic voltammogram of the 1st cycle of comparative preparation example 1 and of the 1st and 100th cycles of preparation example 1.

The electrodes of comparative preparation example 1 and preparation example 1 were placed in a 10 m LiTFSI aqueous electrolyte, and 100 cycles of cyclic voltammetry scanning were performed at a scan rate of 10 mV/s to obtain FIG. 6.

It may be known from FIG. 6 that, the hydrogen evolution current of the 1st cycle and the hydrogen evolution current of the 100th cycle of the electrode of preparation example 1 are respectively about 0.1 mA/cm$^2$ and 1.2 mA/cm$^2$ at the same hydrogen evolution potential (−1.8 V vs. Ag/AgCl). The results show that, as the number of cycles is increased, although the hydrogen evolution current of the electrode of preparation example 1 is increased after 100 cycles, the hydrogen evolution current is still much less than that of comparative preparation example 1 at the 1st cycle.

Experimental Example 5

Figure 7A:
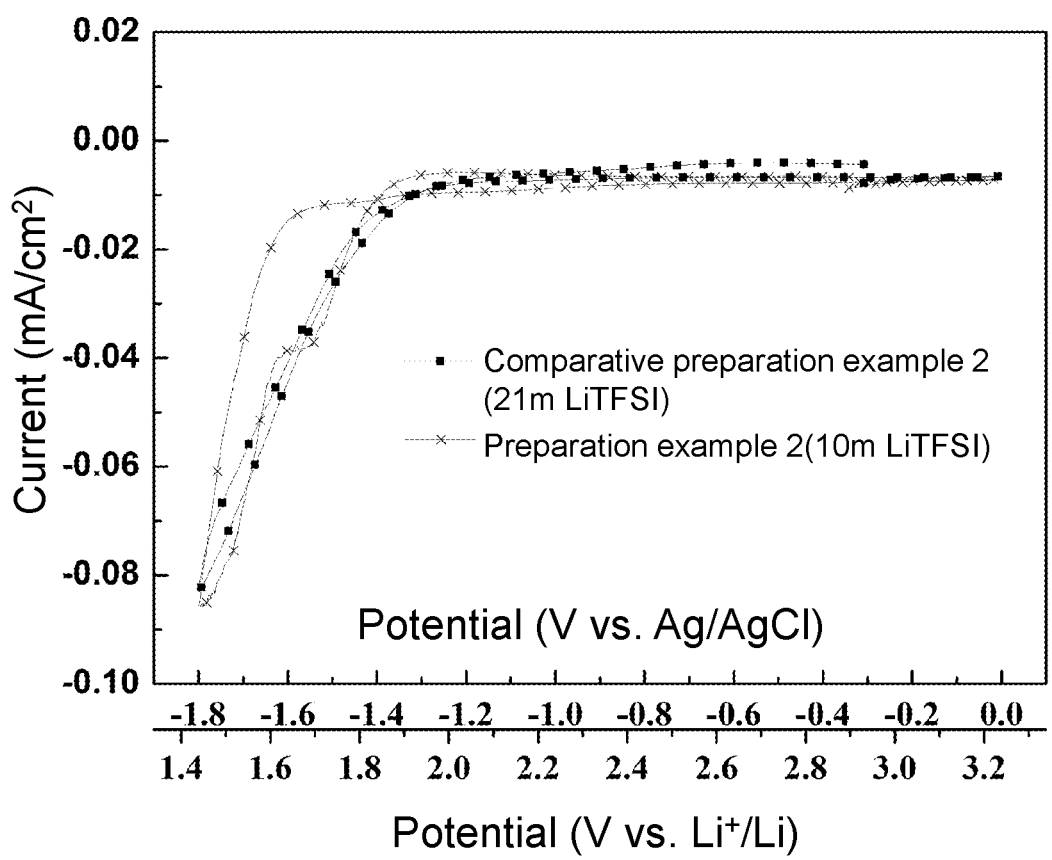
FIG. 7A is a cyclic voltammogram of the 1st cycle of comparative preparation example 2 and preparation example 2.

Cyclic voltammetry scanning was performed on the electrode of comparative preparation example 2 in a 21 m LiTFSI aqueous electrolyte at a scan rate of 1 mV/s. Moreover, cyclic voltammetry scanning was performed on the electrode of preparation example 2 placed in a 10 m LiTFSI aqueous electrolyte at a scan rate of 1 mV/s. The two experimental results are shown in the same curve diagram to obtain FIG. 7A and FIG. 7B. FIG. 7A shows a cyclic voltammogram of the 1st cycle of comparative preparation example 2 and preparation example 2; and FIG. 7B shows a cyclic voltammogram of the 5th cycle of comparative preparation example 2 and preparation example 2.

Figure 7B:
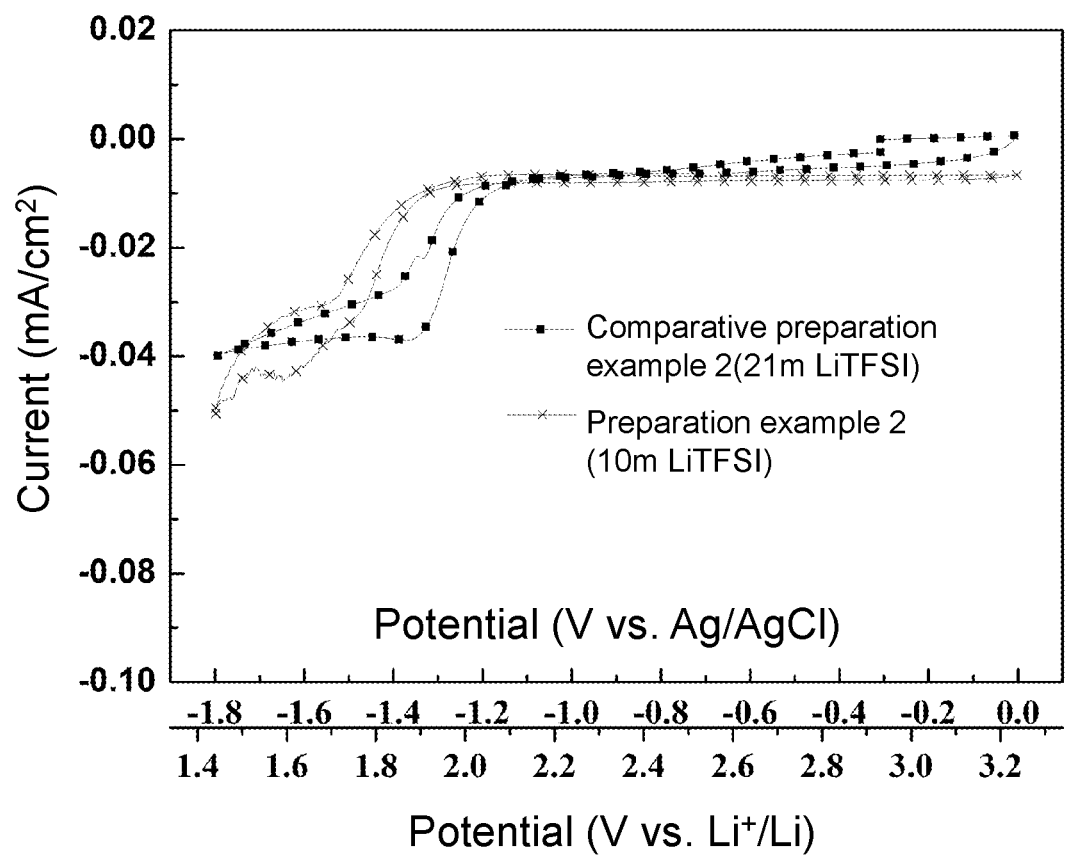
FIG. 7B is a cyclic voltammogram of the 5th cycle of comparative preparation example 2 and preparation example 2.

It may be obtained from FIG. 7A and FIG. 7B that, the hydrogen evolution current of the 1st cycle at −1.8 V (vs. Ag/AgCl) of preparation example 2 in which a low-concentrated aqueous electrolyte was used is similar to the hydrogen evolution current of the 1st cycle at −1.8 V (vs. Ag/AgCl) of comparative preparation example 2 in which a high-concentrated aqueous electrolyte was used. Even after many cycles of scanning, the hydrogen evolution current of the electrode of preparation example 2 in a low-concentrated (10 m) electrolyte is similar to the hydrogen evolution current of the electrode of comparative preparation example 2 in a high-concentrated (21 m) electrolyte. Therefore, the electrode of preparation example 2 may achieve the inhibition of hydrogen evolution effect as a high-concentrated (21 m) electrolyte in a low-concentrated (10 m) electrolyte.

Preparation Example 3

First, a commercial $Li_4Ti_5O_{12}$ material, Super P, and sodium alginate were prepared at a weight ratio of 90:5:5. After $Li_4Ti_5O_{12}$ and Super P were ground, sodium alginate with a calculated weight based on the ratio above as the binder and corresponding sufficient amount of water as the solvent were added, and the components were stirred until the slurry was uniformly mixed.

Next, the slurry was uniformly coated on an aluminum foil via a doctor blade coating method, and drying was performed using a heating plate until the liquid in the coating layer was completely volatilized and the electrode surface had an appearance of dryness and uniform color distribution. Next, the dried electrode was rolled, and then the rolled electrode was placed in an oven for drying to obtain a $Li_4Ti_5O_{12}$ active material aluminum foil.

Next, PVDF powders were added in a DMAC solvent to prepare a PVDF homogeneous solution, then the homogeneous solution was uniformly coated on the $Li_4Ti_5O_{12}$ active material aluminum foil via a doctor blade coating method, and then the aluminum foil was placed in an oven for drying to completely volatilize the solvent to form the PVDF layer used as a first film.

Next, a prepared PVDF homogeneous solution and a commercial Nafion solution were mixed to prepare a colloidal solution having a weight ratio of PVDF:Nafion=1:1, and then the PVDF/Nafion colloidal solution was uniformly coated on the PVDF layer via a doctor blade coating method, and lastly the PVDF layer was placed in an oven for drying to completely volatilize the solvent to obtain a $Li_4Ti_5O_{12}$ active material aluminum foil electrode having a composite layer (first film: PVDF layer; second film: PVDF/Nafion layer).

Preparation Example 4

An electrode was made using the same method as preparation example 3, but a rolling procedure was further added after the PVDF/Nafion layer was formed.

Experimental Example 6

Figure 8A:
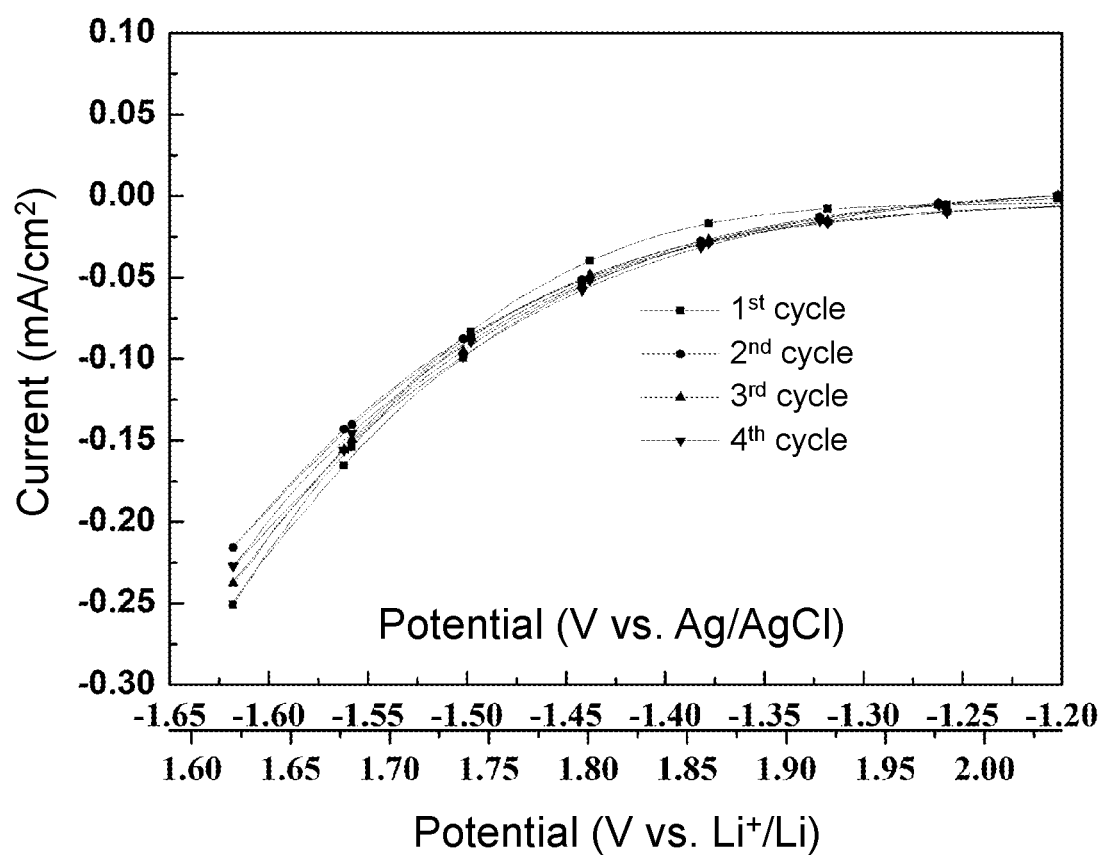
FIG. 8A is a cyclic voltammogram of preparation example 3.
Figure 8B:
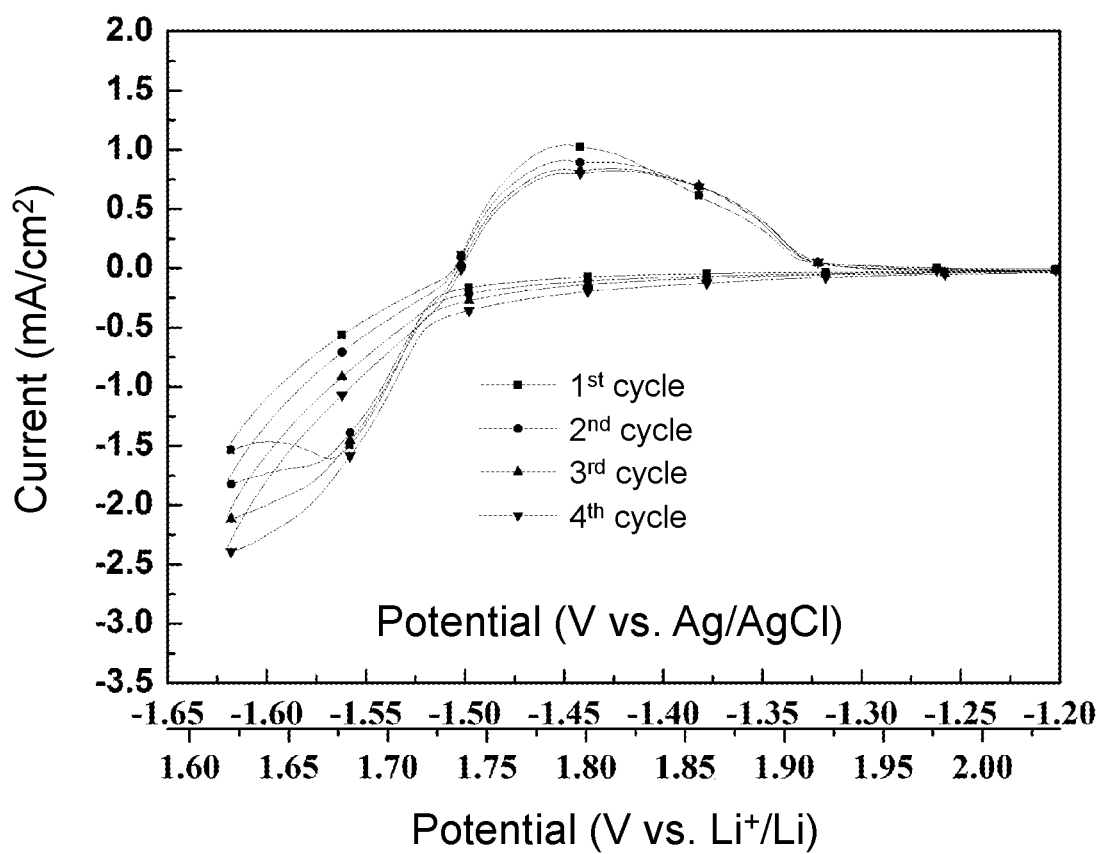
FIG. 8B is a cyclic voltammogram of preparation example 4.

The electrode of preparation example 3 and the electrode of preparation example 4 were compared in a 10 m LiTFSI electrolyte at a scan rate of 0.1 mV/s, and the results are respectively shown in FIG. 8A and FIG. 8B.

It may be known from FIG. 8A that, the $Li_4Ti_5O_{12}$ active material aluminum foil electrode without a rolling procedure does not have an obvious redox peak. It may be known from FIG. 8B that, the $Li_4Ti_5O_{12}$ active material aluminum foil electrode with a rolling procedure has an obvious redox peak.

Experimental Example 7

Figure 9A:
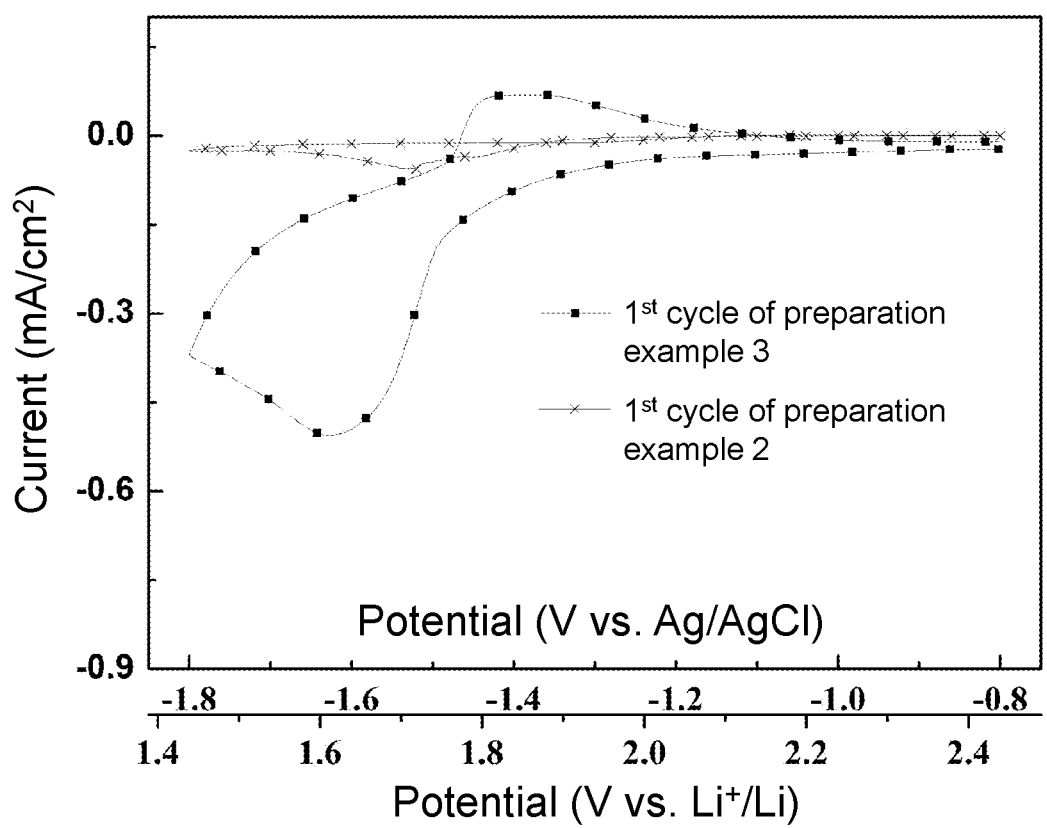
FIG. 9A is a cyclic voltammogram of the 1st cycle of preparation example 2 and preparation example 3.

The electrodes of preparation example 2 and preparation example 3 were compared in a 10 m LiTFSI electrolyte at a scan rate of 0.1 mV/s, and the results are shown in FIG. 9A.

It may be seen from FIG. 9A that, the $Li_4Ti_5O_{12}$ active material aluminum foil electrode having a composite layer has an obvious redox peak, indicating intercalation and deintercalation of lithium ions occurred, and the hydrogen evolution current thereof at a voltage of −1.8 V (vs. Ag/AgCl) is between about 0.3 mA/cm² and 0.6 mA/cm².

Preparation Example 5

An electrode was made using the same method as preparation example 3, and the difference is that the preparation of the coating layer adopted PVDF as the binder instead, $Li_4Ti_5O_{12}$:Super P: PVDF was formed at a weight ratio of 90:5:5, and the solvent was DMAC.

Experimental Example 8

Figure 10A:
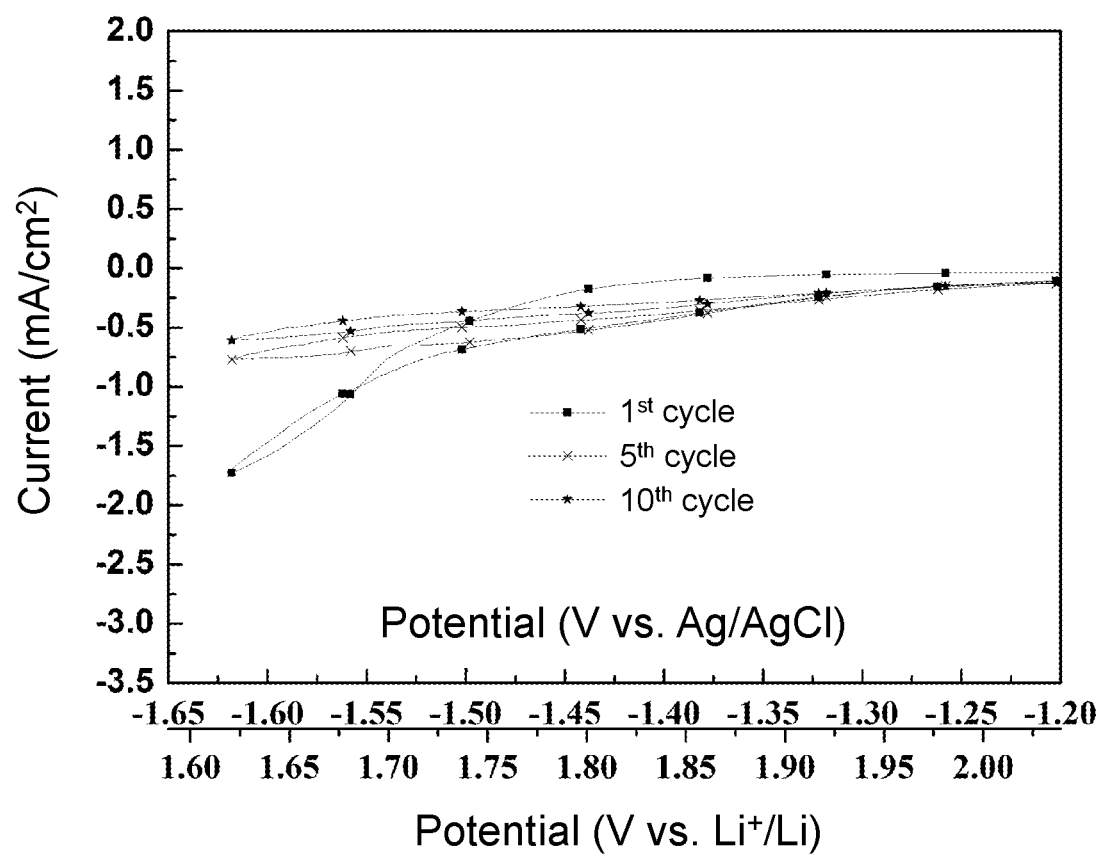
FIG. 10A is a cyclic voltammogram of preparation example 1 (without coating layer).
Figure 10B:
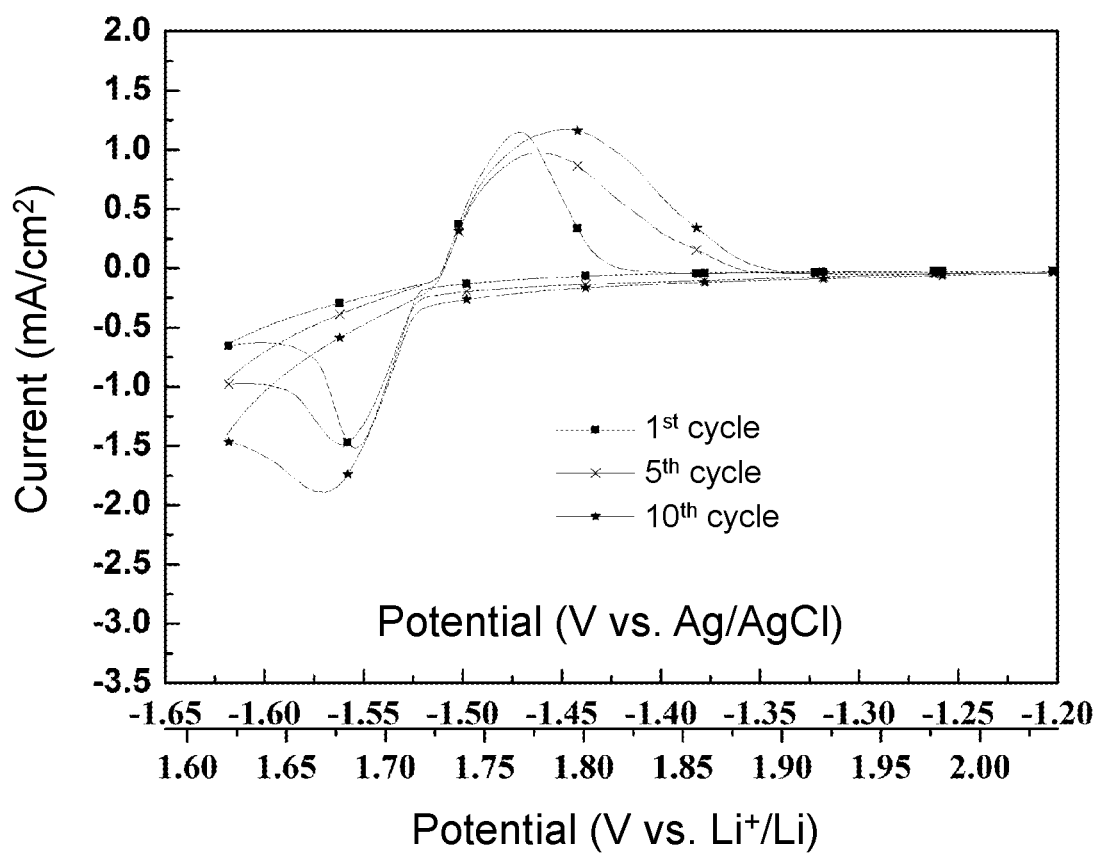
FIG. 10B is a cyclic voltammogram of preparation example 5 (with coating layer).

The electrodes of preparation example 1 and preparation example 5 were compared in a 10 m LiTFSI electrolyte at a scan rate of 0.1 mV/s, and the results are shown in FIG. 10A and FIG. 10B. FIG. 10A shows a cyclic voltammogram of preparation example 1 (without coating layer); and FIG. 10B shows a cyclic voltammogram of preparation example 5 (with coating layer).

It may be obtained from FIG. 10A and FIG. 10B that, the $Li_4Ti_5O_{12}$ active material aluminum foil electrode with a coating layer has an obvious redox peak, while the electrode without a coating layer only has a subtle redox peak.

Preparation Example 6

First, a self-synthesized $Mo_6S_8$, Super P, and PVDF (or sodium alginate) were prepared at a weight ratio of 18:1:1. After $Mo_6S_8$ and Super P were ground, PVDF (or sodium alginate) with a calculated weight based on the ratio above as the binder and corresponding sufficient amount of NMP (or water) as the solvent were added, and the components were stirred until the slurry was uniformly mixed.

Next, the slurry was uniformly coated on a titanium foil via a doctor blade coating method, and drying was performed using a heating plate until the liquid in the coating layer was completely volatilized and the electrode surface had an appearance of dryness and uniform color distribution. Next, the dried electrode was rolled, and then the rolled electrode was placed in an oven for drying to obtain a $Mo_6S_8$ active material titanium foil.

Next, PVDF powders were added in an NMP solvent to prepare a PVDF homogeneous solution, then the homogeneous solution was uniformly coated on a $Mo_6S_8$ active material titanium foil via a doctor blade coating method, and then the titanium foil was placed in an oven for drying to completely volatilize the solvent to form the PVDF layer used as a first film.

Next, a prepared PVDF homogeneous solution and a commercial Nafion solution were mixed to prepare a colloidal solution having a weight ratio of PVDF:Nafion=1:1, and then the PVDF/Nafion colloidal solution was uniformly coated on the PVDF layer via a doctor blade coating method, and lastly the PVDF layer was placed in an oven for drying to completely volatilize the solvent to obtain a $Mo_6S_8$ active material titanium foil electrode having a composite layer (first film: PVDF layer; second film: PVDF/Nafion layer).

Comparative Preparation Example 3

An electrode was made using the same method as preparation example 6, but the composite layer (first film: PVDF layer; second film: PVDF/Nafion layer) was omitted.

Experimental Example 9

Figure 11A:
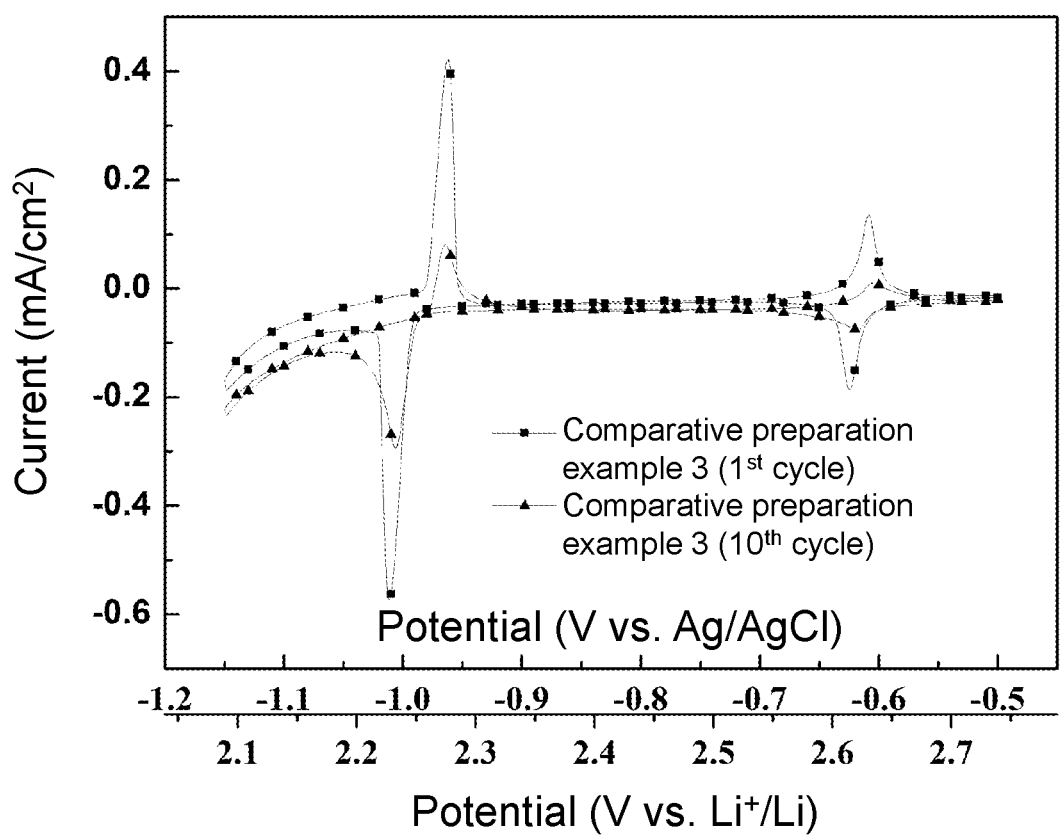
FIG. 11A is a cyclic voltammogram of comparative preparation example 3.
Figure 11B:
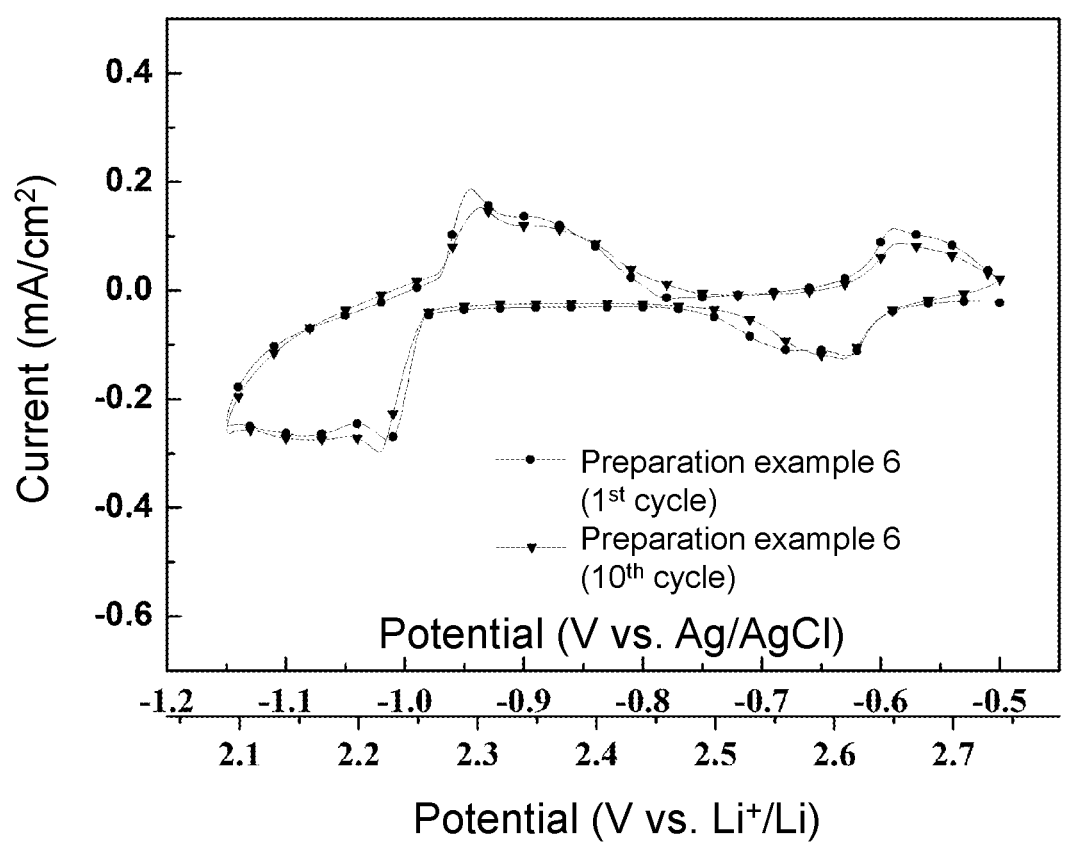
FIG. 11B is a cyclic voltammogram of preparation example 6 (10 m LiTFSI).

10 cycles of a cyclic voltammetry test were performed on the electrodes of comparative preparation example 3 and preparation example 6 in a 10 m LiTFSI electrolyte at a scan rate of 0.1 mV/s, and the results are respectively shown in FIG. 11A and FIG. 11B.

It may be seen from the comparison of the 1st cycle and 10th cycle of different electrodes in FIG. 11A and FIG. 11B that, the reaction current of a $Mo_6S_8$ active material titanium foil electrode having a composite layer (preparation example 6) is smaller, and the effect of hydrogen evolution inhibition is still achieved after 10 scan cycles. Moreover, it may be seen from the curves that, the composite layer may provide the effects of stable battery reaction, inhibiting irreversible reaction, and extending cycle life.

Experimental Example 10

Figure 12:
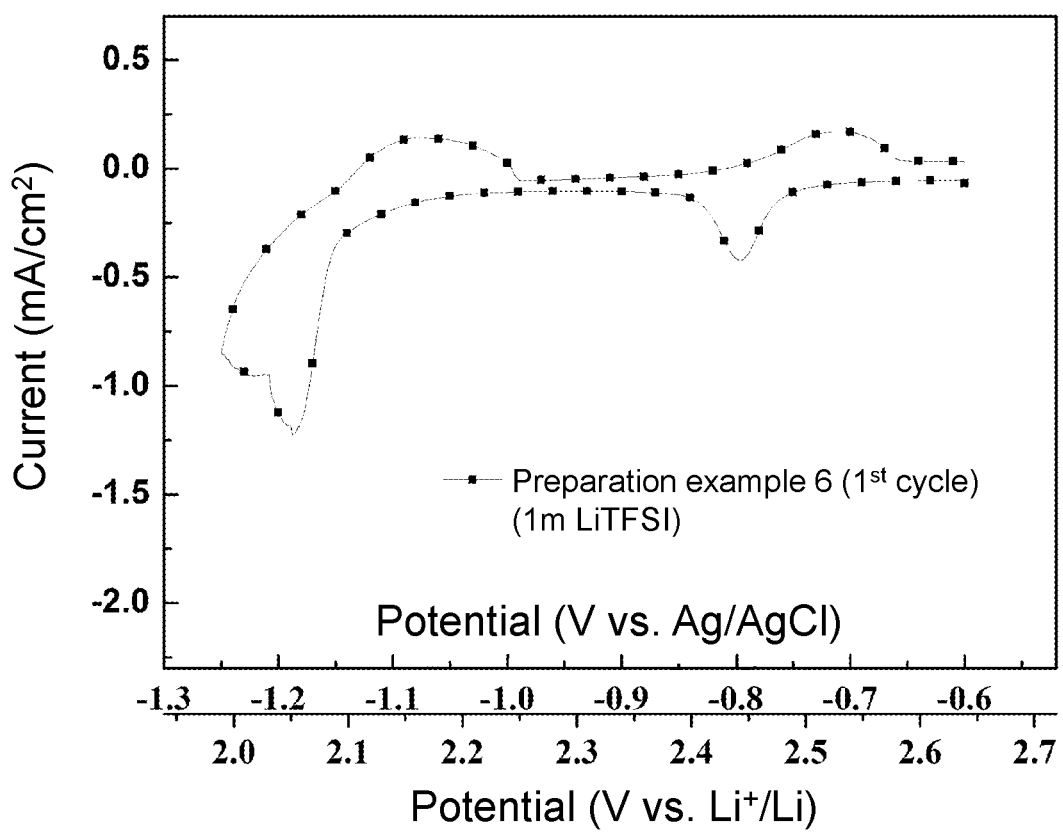
FIG. 12 is a cyclic voltammogram of preparation example 6 (1 m LiTFSI).

A cyclic voltammetry test was performed on the $Mo_6S_8$ active material titanium foil electrode of preparation example 6 in a 1 m LiTFSI electrolyte at a scan rate of 0.1 mV/s, and the results are shown in FIG. 12. Therefore, it may be known from FIG. 12 that, the electrode of the disclosure still has the function of charge and discharge in a low-concentrated electrolyte.

Preparation Examples 9 to 10

An electrode was made using the same method as preparation example 1, but the materials of the first film and the second film were changed to the materials and weight ratios of Table 1 below, and the water contact angle of each film captured at 50 minutes was recorded in Table 1.

TABLE 1

| Preparation example | Material of first film | Contact angle | Material of second film | Contact angle |
|---|---|---|---|---|
| 9 | PTFE | 110 | PTFE/PVA (Weight ratio 1:1) | 12.53 |
| 10 | PVDF | 54.13 | PVDF/PVA (Weight ratio 1:1) | 18.76 |

It may be obtained from Table 1 that, the water contact angles of the first film and the second film formed by the materials above are both within the range of the disclosure, and therefore an electrode having a composite layer of the first film and the second film should achieve the technical effects verified in the experimental examples above.

Preparation Example 11

An electrode was made using the same method as preparation example 5, and the difference is the method of forming the first film and the second film.

In detail, after preparing a 2 wt % PVDF homogeneous solution by adding PVDF powders in a DMAC solvent, the $Li_4Ti_5O_{12}$ active material titanium foil was impregnated into the homogeneous solution for 0.5 hour under negative pressure (about 60 mmHg), and then the electrode was dried to form the PVDF layer, used as the first film of the electrode, on the $Li_4Ti_5O_{12}$ active material titanium foil.

Next, the prepared 2 wt % PVDF homogeneous solution and a commercial Nafion solution were mixed to prepare a colloidal solution having a weight ratio of PVDF:Nafion=1:1, and then the $Li_4Ti_5O_{12}$ active material titanium foil having the PVDF layer was impregnated into the colloidal solution for 0.5 hour under negative pressure (about 60 mmHg), and lastly the electrode was heated to completely volatilize the solvent to obtain a $Li_4Ti_5O_{12}$ active material titanium foil electrode having a composite layer (first film: PVDF layer; second film: PVDF/Nafion layer).

Experimental Example 11

Figure 9B:
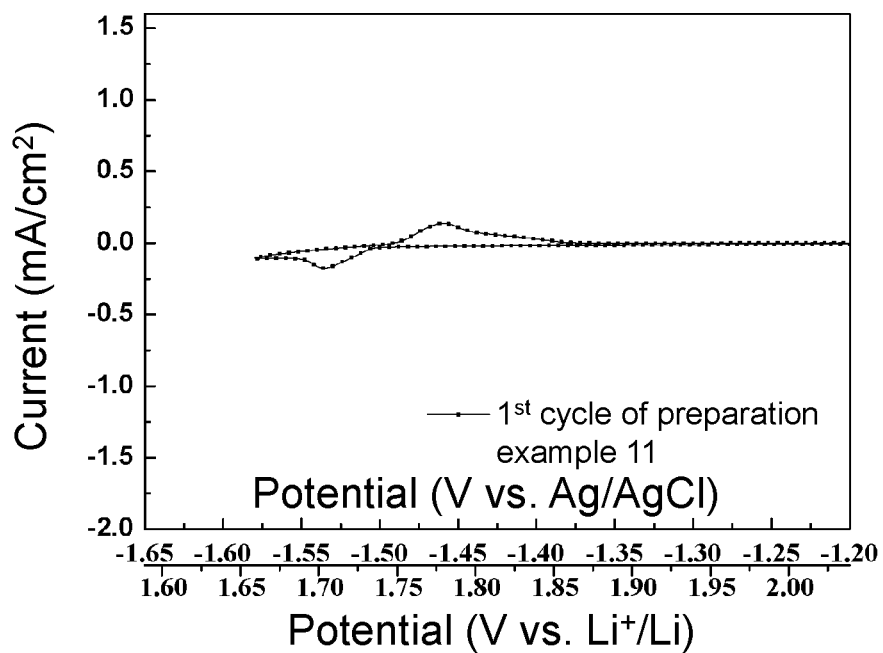
FIG. 9B is a cyclic voltammogram of the 1st cycle of preparation example 11.

The electrode of preparation example 11 was in a 10 m LiTFSI electrolyte at a scan rate of 0.1 mV/s, and the results are shown in FIG. 9B.

It may be known from FIG. 9B that, the $Li_4Ti_5O_{12}$ active material titanium foil electrode having the composite layer after negative pressure impregnation has an obvious redox peak, indicating intercalation and deintercalation of lithium ions occurred, and the hydrogen evolution current thereof at a voltage of −1.6 V (vs. Ag/AgCl) is about 0.1 mA/cm². Therefore, in comparison with the doctor blade coating method, the $Li_4Ti_5O_{12}$ active material titanium foil electrode having the composite layer formed by negative pressure impregnation has better inhibition of hydrogen evolution effect. Moreover, it can also be known from FIG. 9B that, the redox peak has better symmetry, and thus it is proven that the electrode formed by negative pressure impregnation is good in charge and discharge reversibility, stability and cycle performance.

Preparation Example 12

An electrode was made using the same method as preparation example 11, and the difference is the method of forming the second film.

In detail, after forming the first film, the second film is formed as the same way as Preparation example 5 to obtain a $Li_4Ti_5O_{12}$ active material titanium foil electrode having a composite layer (first film: PVDF layer; second film: PVDF/Nafion layer).

Experimental Example 12

Figure 9C:
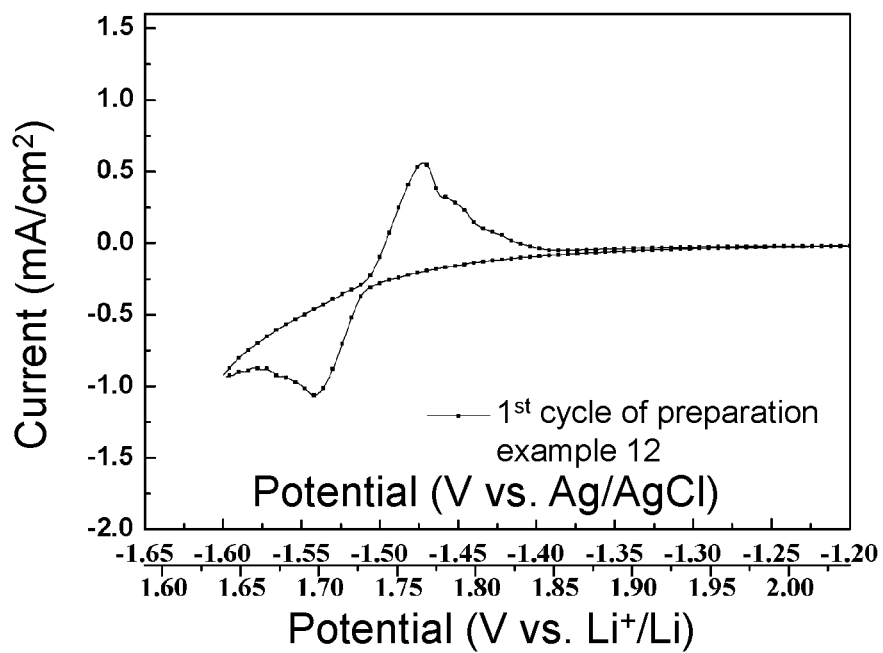
FIG. 9C is a cyclic voltammogram of the 1st cycle of preparation example 12.

The electrode of preparation example 12 was in a 10 m LiTFSI electrolyte at a scan rate of 0.1 mV/s, and the results are shown in FIG. 9C.

It may be known from FIG. 9C that, the $Li_4Ti_5O_{12}$ active material titanium foil electrode having the composite layer after negative pressure impregnation has an obvious redox peak, indicating intercalation and deintercalation of lithium ions occurred, and the hydrogen evolution current thereof at a voltage of −1.6 V (vs. Ag/AgCl) is about 1 mA/cm². Therefore, in comparison with the formation of the first and second films using the doctor blade coating method, the redox peak of the $Li_4Ti_5O_{12}$ active material titanium foil electrode having the composite layer has better symmetry in which the first film is formed by impregnation under negative pressure and the second film is formed using the doctor blade coating method.

Based on the above, the electrode of the disclosure has a composite layer formed by two films having different polarities, and the first film having a greater water contact angle and in contact with the electrode active material in the composite layer is used with the outer-layer second film having a smaller water contact angle to inhibit the hydrogen evolution reaction of the anode of the aqueous lithium-ion battery so as to increase the operating voltage window of the aqueous lithium-ion battery in order to stabilize the reaction of the aqueous lithium-ion battery and inhibit the irreversible reaction so as to extend cycle life. In addition, if at least one film of the composite layer is formed by impregnation under negative pressure, the electrode having the composite layer may be good in charge and discharge reversibility, stability and cycle performance.

It will be apparent to those skilled in the art that various modifications and variations may be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An electrode of an aqueous lithium-ion battery, consisting of:
 a current collector;
 a coating layer disposed on at least one surface of the current collector, and the coating layer contains an active material; and
 a composite layer disposed on a surface of the coating layer, and the composite layer comprises a first film and a second film, wherein the first film is between the second film and the surface of the coating layer, and the water contact angle of the first film is greater than the water contact angle of the second film, wherein a material of the first film and a material of the second film are each independently selected from a polymer or a copolymer.

2. The electrode of claim 1, wherein the water contact angle of the first film is between 50° and 110°.

3. The electrode of claim 1, wherein the water contact angle of the second film is between 10° and 30°.

4. The electrode of claim 1, wherein the material of the first film is selected from a polymer polymerized from a monomer of fluorocarbons or chlorocarbons or a copolymer formed by a combination of the monomers of fluorocarbons or chlorocarbons or functionalized monomers thereof.

5. The electrode of claim 1, wherein the material of the second film is a mixture of a first substance and a second substance, the first substance is selected from a polymer formed by a monomer of fluorocarbon or chlorocarbon or a copolymer formed by a combination of the individual monomers or a functionalized monomer thereof, and the second substance is selected from a polymer formed from a monomer of fluorocarbon, chlorocarbon, aromatic hydrocarbon, heterocyclic compound, alcohol, ether, carboxylic acid, ester, or amide or a copolymer formed by a combination of the individual monomers or a functionalized monomer thereof.

6. The electrode of claim 5, wherein a weight ratio of the first substance to the second substance is between 2:3 and 3:2.

7. The electrode of claim 1, wherein the active material comprises a lithium element, a transition metal element, a Group XIII to Group XV element or an oxide, a sulfide, a nitride, a phosphide, or a carbide thereof, or a combination of the above.

8. The electrode of claim 1, wherein the active material comprises metastable phase spherical carbon, vapor-grown carbon fiber, carbon nanotube, coke, carbon black, natural graphite, artificial graphite, acetylene black, carbon fiber, glassy carbon, $Li_2O$, $Li_3FeN_2$, $Li_{2.6}Co_{0.4}N$, $Li_{2.6}Cu_{0.4}N$, SnO, $SnO_2$, GeO, $GeO_2$, $In_2O$, $In_2O_3$, PbO, $PbO_2$, $Pb_2O_3$, $Pb_3O_4$, $Ag_2O$, AgO, $Ag_2O_3$, $Sb_2O_3$, $Sb_2O_4$, $Sb_2O_5$, SiO, SiC, ZnO, CoO, NiO, FeO, $TiO_2$, $Li_3Ti_5O_{12}$, $Li_4Ti_5O_{12}$, $Mo_6S_8$, or a combination of the above.

9. The electrode of claim 1, wherein the coating layer further contains a conductive particle and a binder.

10. The electrode of claim 9, wherein the conductive particle comprises grain graphite, vapor-grown carbon fiber, carbon black, acetylene black, nickel powder, aluminum powder, titanium powder, stainless steel powder, or a combination of the above.

11. The electrode of claim 9, wherein the binder comprises sodium alginate, polyvinylidene fluoride, styrene butadiene rubber, polyamide, melamine resin, or a combination of the above.

12. An aqueous lithium-ion battery comprising a cathode, an anode, a separator disposed between the cathode and the anode, and an aqueous electrolyte, wherein
the anode is the electrode of claim 1.

13. The aqueous lithium-ion battery of claim 12, wherein the aqueous electrolyte comprises a lithium salt and water.

14. The aqueous lithium-ion battery of claim 13, wherein the lithium salt comprises lithium bis(trifluoromethylsulfonyl)imide (LiTFSI), $LiNO_3$, or lithium trifluoromethanesulfonate (LiOTf).

15. A method of manufacturing an electrode of claim 1, which is the electrode of an aqueous lithium-ion battery, the method comprising:
providing a current collector;
forming a coating layer on at least one surface of the current collector, and the coating layer contains an active material; and
forming a composite layer on a surface of the coating layer, wherein the composite layer is selected from a polymer or a copolymer, and the composite layer comprises a first film and a second film, wherein at least one of the first film and the second film is formed by impregnation, and the water contact angle of the first film is greater than the water contact angle of the second film.

16. The method of manufacturing an electrode of an aqueous lithium-ion battery of claim 15, wherein the step of forming the composite layer comprising:
forming the first film on the surface of the coating layer; and
forming the second film on the first film.

17. The method of manufacturing an electrode of an aqueous lithium-ion battery of claim 15, wherein the impregnation is performed under negative pressure.

* * * * *